Sept. 26, 1950  A. W. EDWARDS  2,523,984
CIRCUIT OPENING DEVICE
Filed July 20, 1945
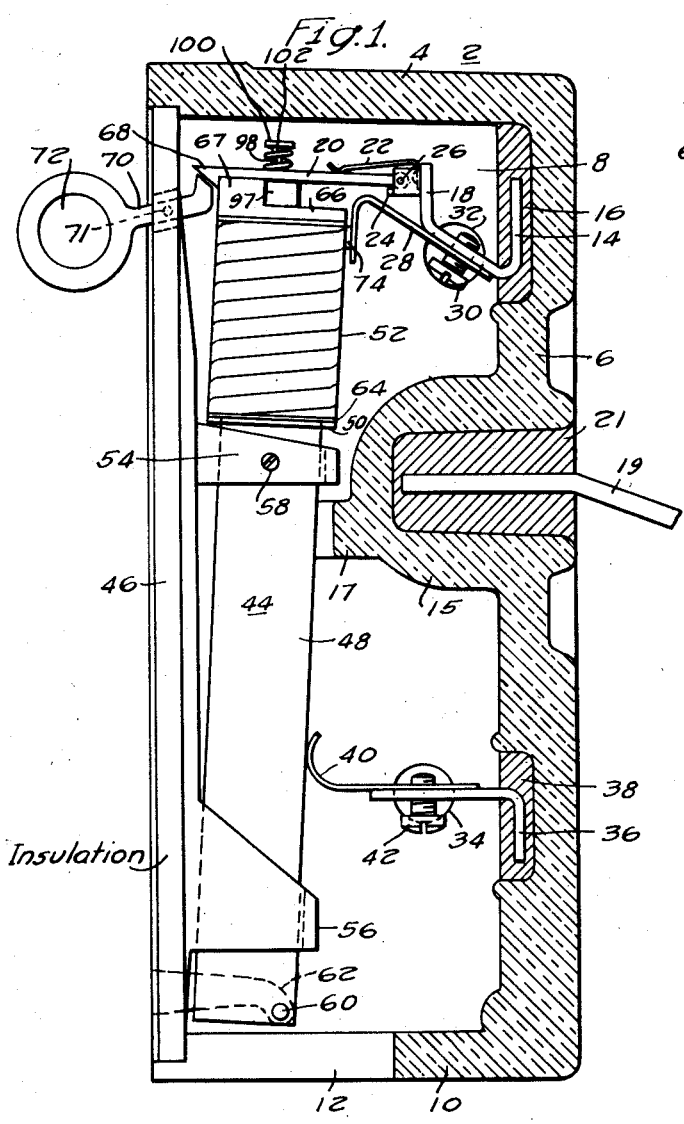
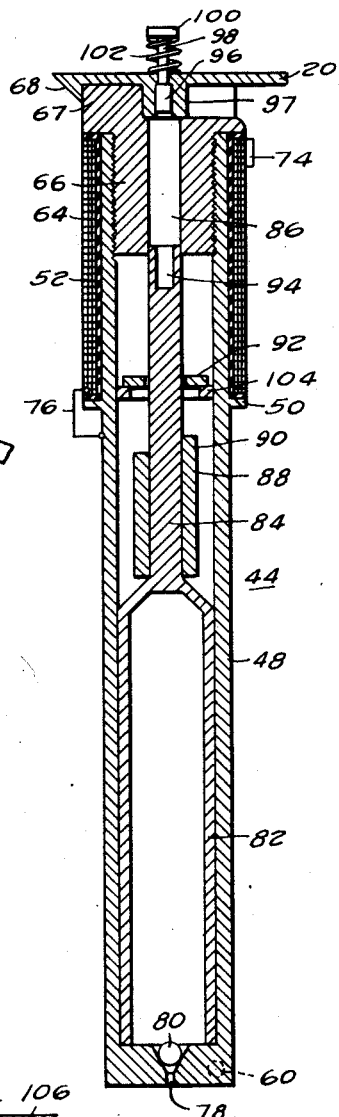
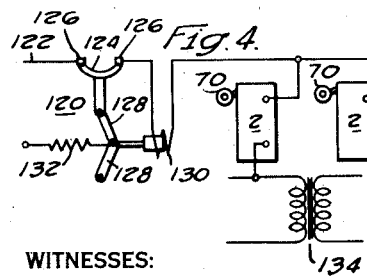
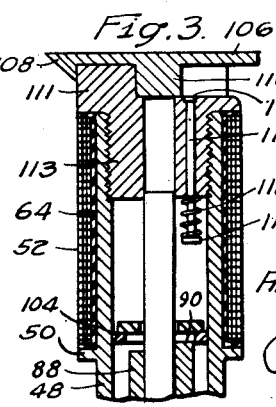
WITNESSES:
E. A. M'Closkey
G. T. Stratton
INVENTOR
Andrew W. Edwards
BY
Ralph H. Swingle
ATTORNEY Patented Sept. 26, 1950

2,523,984

UNITED STATES PATENT OFFICE 2,523,984

CIRCUIT OPENING DEVICE

Andrew W. Edwards, Wilkinsburg, Pa., assignor to Westinghouse Electric Corporation, East Pittsburgh, Pa., a corporation of Pennsylvania Application July 20, 1945, Serial No. 606,203

13 Claims. (Cl. 200—108)

This invention relates generally to electric circuit opening devices, and especially to such devices which are adapted to isolate faulted circuits.

It is customary in radial power distribution circuits to employ fuses for the purpose of isolating branch circuit transformers when a fault occurs in the transformer or branch circuit. Such circuits usually are also provided with automatic reclosing circuit breakers to restore service on the unfaulted parts of the circuit. Some trouble has been experienced in the past due to the difficulty of properly coordinating such circuit breakers and fuses because of their different clearing time-current characteristics, and also because unnecessary service interruptions often occur due to blowing of the fuses by lightning surge currents and transient overloads.

Accordingly, one object of this invention is to provide a novel circuit opening device adapted to replace fuses, but which will not open the circuit on surge currents.

Another object of this invention is to provide a novel circuit opening device which coordinates with automatic reclosing circuit breakers in a manner such as to open the circuit during the open circuit portion of the breaker operating cycle.

Another object of this invention is to provide a novel circuit opening device adapted to automatically open the circuit in response to the number of times an overload appears on the circuit in a predetermined period.

Another object of this invention is to provide a simple type of circuit opening means constructed in a novel manner so as to coordinate with any type of circuit breaker which may be employed on the same circuit.

Another object of this invention is to provide a novel form of circuit opening means which may be employed in a given circuit irrespective of the available fault current.

These and other objects of this invention will become more apparent upon consideration of the following detailed description of preferred embodiments thereof, when taken in connection with the attached drawing, in which:

Figure 1 is a substantially central vertical section view of a circuit opening device constructed in accordance with this invention, with certain of the parts shown in elevation;

Fig. 2 is an enlarged vertical section view of the circuit opening device shown in Fig. 1;

Fig. 3 is a partial section view of a modified form of circuit opening device; and Fig. 4 is a schematic diagram of a circuit employing the circuit opening device of this invention.

The circuit opening device comprising this invention is preferably contained within a housing 2 of insulating material, such as porcelain or the like. Housing 2 includes a top wall 4, rear wall 6, side walls 8 (only one of which is shown), and a bottom wall 10 having a slot 12 therein. One leg 14 of a substantially U-shaped bracket is adapted to be secured in a depression provided in rear wall 6 of the housing adjacent the upper end thereof, as by cast metal 16 which is poured into the depression around leg 14 of the bracket. The other leg 18 of the bracket is adapted to support a pivoted latch 20, as by a pivot pin 26, and a leaf spring 22 for biasing latch 20 in a counterclockwise direction, as viewed in Fig. 1, into engagement with a stop shoulder 24. A contact leaf spring 28 is also adapted to be secured to the U-shaped bracket, as by a screw 30, which may also serve to secure a line conductor to the contact spring, with the conductor being led into the housing through an opening 32 provided in a side wall 8 thereof.

Rear wall 6 of the housing is provided intermediate the ends thereof with an inwardly extending projection 15 having an arcuate flange 17 at the inner side thereof. Projection 15 is hollowed out at the outside of rear wall 6 of the housing to form a cavity for receiving a hanger 19 adapted to be secured in the cavity by cast metal 21 or the like. Hanger 19 may be secured to a cross arm, or other supporting means, to mount housing 2 in operative position.

Adjacent the lower end of rear wall 6 of the housing, there is provided a second depression at the inner side thereof, in which one leg of an angular bracket 36 is adapted to be secured, for example, as by cast metal 38. The other leg of bracket 36 is adapted to support a spring contact strip 40 which may be secured thereto by a screw 42 which, like screw 30, may also act to secure a line conductor to bracket 36, with the conductor being led into the housing through an opening 34 provided in a side wall 8 of the housing.

The circuit opening device proper 44 is adapted to be mounted on a door 46 for the open front of housing 2, with the door being of insulating material, preferably a molded insulating material. The circuit opening device comprises a metal tube 48 of electrical conducting material, such as copper or brass, having an integral flange 50 on the exterior thereof adjacent its upper end on which a solenoid coil 52 is adapted to be seated. Tube 48 is adapted to be secured to door 46 by mounting of the tube in sleeve portions 54 and 56 provided adjacent opposite ends of the door, and preferably integral therewith, with one of the sleeve portions 54 provided with a set screw 58 adapted to engage tube 48 when inserted therein for preventing longitudinal movement of the tube relative to the door. Door 46 and tube 48 are mounted for pivotal movement together relative to housing 2 by integral opposed trunnions 60 provided at the lower end of tube 48, and adapted to be received in slots 62 provided in side walls 8 of the housing.

Solenoid coil 52 is preferably wound on a spool of insulating material 64, preferably of a molded insulating material, and it is held in place by a threaded plug 66 adapted to be threaded into the upper end of tube 48, and having a shoulder adapted to overlie the upper end of tube 48 and solenoid coil 52. Plug 66 is provided with a projection 67 at one side thereof adapted to be engaged by a hook 68 provided at the outer end of pivoted latch 20, to hold the circuit opening device in its closed circuit position and the door in its closed position relative to housing 2. Door 46 is provided adjacent the upper end thereof with an opening for receiving a release lever 70 pivotally mounted in the opening on a pivot pin 71, and having at its outer end an integral hookeye portion 72, and having its inner end formed with an oblique surface adapted to be positioned, in the closed position of the parts, immediately beneath hook 68 of the latch lever.

The circuit through the interrupting device extends from one contact spring 28 to a contact 74 provided adjacent the upper end of solenoid coil 52 and electrically connected with one end of the coil; the other end of solenoid coil 52 is connected by a conductor 76 with tube 48, and this being engaged by contact spring 40 completes the circuit to the other line contact of the housing. With the parts in the closed position shown in Fig. 1, a hookstick or the like may be inserted in hookeye 72 to move it downwardly in a counterclockwise direction about its pivot pin 71 to thereby raise latch lever 20 so that a continued downward pull on release lever 70 will cause pivotal movement of the interrupting device and door in a counterclockwise direction on trunnions 60. The door and circuit opening device may be moved pivotally to a depending position relative to housing 2 where the door and tube 48 will be received in slot 12 of lower housing wall 10. In this position, the circuit opening device is disconnected from line contacts 28 and 40 and may be entirely removed from housing 2 by lifting the device upwardly and then outwardly relative to the housing to move trunnions 60 out of slots 62 provided in the side walls of the housing. It is believed apparent that the circuit opening device and door may be assembled with the housing by moving trunnions 60 on the tube into slots 62 with the door and circuit opening device held upside down with respect to the position thereof shown in Fig. 1; whereupon, they may then be moved pivotally in a clockwise direction about trunnions 60 by means of hookeye 72 to the closed circuit position shown in Fig. 1, where the circuit opening device is latched in closed circuit position with contact 74 in engagement with line contact spring 28, preferably with spring 28 being in stressed condition so that it exerts a force on circuit opening device 44 in a direction outwardly of the housing, and with contact spring 40 engaging tube 48 and also urging it outwardly relative to housing 2. Inasmuch as the door and circuit opening device are secured together, the door is also held in a position closing the front opening of the housing.

Referring to Fig. 2, it will be observed that tube 48 of the circuit opening device is provided with a closed bottom wall having an inlet opening 78 thereon, on which a ball check valve 80 is adapted to seat, to permit the flow of air into tube 48, but to check the flow of air out of the lower end of the tube. A cylindrical piston 82 is mounted within tube 48 and is closed at its upper end to which a piston rod 84 is secured, or made integral therewith. Threaded plug 66 is provided with a bore 86 for receiving the upper end of piston rod 84, and a tubular solenoid core 88 of magnetic material, such as soft iron or the like, is slidably mounted on piston rod 84 and normally occupies the position shown in Fig. 2 to which it is biased by gravity. The upper end of tubular core 88 is provided at one side with a projection 90 adapted to engage one side of a washer 92 positioned on the piston rod above core 88, and normally supported in a horizontal position by a supporting ring 104 secured in tube 48. The upper end of piston rod 84 is provided with a bore 94 of a side to receive the enlarged lower end 96 of a retaining rod 98 also of magnetic material, and adapted to be slidably mounted in an opening provided in latch lever 20, with the enlarged portion 96 slidable in a sleeve portion 97 formed integral with the latch lever. The upper end of retaining rod 98 is provided with a head 100 adapted to be engaged by a compression spring 102 reacting against the latch lever to normally hold the rod retracted at the position shown in Fig. 2.

The circuit opening structure described above is adapted for use as previously pointed out for the purpose of isolating branch circuit transformers when the circuit or transformer has a permanent fault. In Fig. 4, there is illustrated schematically a main line conductor 122 provided with an automatic reclosing circuit breaker 120 which may be of any desired type, such as the type having a movable bridging contact 124 adapted to bridge the line contacts 126 in the closed position of the breaker, and arranged to be actuated by suitable means such as toggle levers 128 under the influence of a series operating coil 130, to open the circuit, and adapted to be reclosed by a reclosing spring 132 when the circuit is interrupted by extinguishment of the arc drawn between contacts 124 and 126. The patent to J. M. Wallace, No. 2,333,604, issued November 2, 1943, on a Circuit Interrupter, and assigned to the same assignee of this invention, illustrates one type of automatic reclosing circuit breaker which may be employed as breaker 120. A transformer 134, which may supply a branch circuit, is shown as being connected to the main line conductor by a circuit opening device contained in a housing 2 and constructed in accordance with this invention. Two branch circuits are shown in Fig. 4 as connected to line conductor 122, but it is apparent that as many branch circuits as are desired may be connected in a like manner to conductor 122.

On normal currents, core 88 of the circuit opening device rests at the bottom of piston rod 84. However, when the current drawn by transformer 134 exceeds a predetermined value, depending on the design of solenoid coil 52, core 88 is drawn upwardly into coil 52. As core 88 rises in tube 48, projection 90 thereof engages one side of washer 92 causing the washer to tilt and bind on piston rod 84 to thereby carry the piston rod and piston 82 upwardly with core 88. This upward movement of piston 82 is relatively unimpeded as air is freely drawn into the lower end of tube 48 through inlet 78. Piston rod 84 is thus raised to a position closely adjacent, but not engaging, the lower end of sleeve portion 97 on the latch lever. When the current through coil 52 is interrupted by operation of circuit breaker 120, core 88 drops back to a position resting on piston 82. If the fault has cleared upon automatic reclosure of circuit breaker 120, piston 82 will slowly sink to its normal position shown in Fig. 2, as the air under the piston gradually escapes, thus resetting the device. However, if the fault still persists when the circuit is reclosed by circuit breaker 120, core 88 is again drawn upwardly. This time the washer 92 grips the piston rod 84 at a lower point and advances it a further amount, as it has not had time to sink back to its normal position. Such further advancement of piston rod 84 causes the upper end thereof to raise latch lever 20 to release the circuit opening device and door. This would permit the circuit opening device and door to rotate about trunnion 60 due to gravity and the stress stored in contact springs 28 and 40, to a depending position relative to housing 2, except for the fact that retaining rod 98, being of magnetic material, is drawn down by solenoid coil 52 so that the enlarged portion 96 thereof is received in bore 94 in the upper end of piston rod 84, thus preventing outward movement of the circuit opening device and door, even though hook 68 of the latch is removed from projection 67. However, when the circuit is again interrupted by circuit breaker 120, retaining pin 98 is released and will be restored to its normal position relative to the latch lever by spring 102, thus withdrawing the enlarged portion 96 thereof from bore 94 in piston rod 84, to then allow the circuit opening device and door to swing out and disconnect transformer 134 and its associated circuit from main line conductor 122. It will be observed that this disconnection is accomplished only after the circuit has been opened by circuit breaker 120, and therefore no interrupting means or arc-extinguishing means is needed in conjunction with circuit opening device 44, because no arc is drawn when this device disengages contact springs 28 and 40. Because this device operates to open the circuit only when the circuit has already been opened by circuit breaker 120, there is no coordination problem with the circuit breaker because it does not operate to interrupt the circuit and is therefore not dependent for operation on the time-current characteristics of breaker 120. As circuit opening device 44 does not employ a fusible element, operation thereof by surge currents, or the like, is eliminated; and, since it does not recognize fault current magnitude in its operation, but depends only on the number of times fault current flows in the circuit, it will not operate on surges because of their short duration. After the faulted branch circuit has been opened by operation of its interrupting device in housing 2, it is apparent that reclosure of circuit breaker 120 will then restore service to the remaining branch circuits.

The embodiment of the invention shown in Fig. 3 employs many of the same parts previously described in connection with Figs. 1, 2 and 4, and consequently like reference numerals are employed to designate such like parts. The tube 48 in this embodiment of the invention is provided with a threaded plug 113 in the upper end thereof having a projection 111 at one side similar to plug 66 previously described, for cooperation with a hook 108 formed on the outer end of a latch lever 106. The latch lever 106 is similar to the lever 20 previously described, except that it is provided with a solid projection 110 overlying a central bore in plug 113, and this projection is adapted to cooperate with a retaining rod 112 slidably mounted in an eccentric bore provided in plug 113. Retaining rod 112 is provided with a head 114 at the upper end thereof normally held in engagement with the upper surface of plug 113 by a coil compression spring 118 reacting between a head 116 on the other end of the rod and the inner end of plug 113.

In the operation of the circuit opening device shown in Fig. 3, on a continuing fault when core 88 is drawn upwardly, it causes upward movement of pin 112 so that it engages behind projection 110 on latch lever 106. Thus, on the second closely successive energization of solenoid coil 52, piston rod 84 will engage projection 110 and raise the latch lever enough so that hook 108 is disengaged from projection 111 of plug 113. However, due to the fact that washer 92 in its upward movement has raised rod 112 to a position behind projection 110, circuit opening movement of the interrupter will be prevented until after the circuit is interrupted by a circuit breaker, such as breaker 120, to permit return movement of piston rod 84 and withdrawal of retaining rod 112 from behind latch lever projection 110 by spring 118. The operation is, therefore, similar to that of the embodiment of the invention shown in Figs. 1, 2 and 4, and the device shown in Fig. 3 will reset if the circuit returns to normal condition before two closely successive energizations of coil 52 in the same manner.

From the foregoing, it is apparent that this invention provides a circuit opening device which will not open the circuit on surge currents or the like, because it does not operate as would a fuse in response to the magnitude of overload currents, but only opens the circuit in response to a plurality of closely successive occurrences of the overload. Further, because the circuit opening device operates to open the circuit only after the circuit has been opened by a circuit interrupter, such as a circuit breaker, there is no coordination problem with the circuit breaker or other circuit interrupting device which may be connected in the same circuit system.

From another aspect, the circuit interrupting device comprising this invention performs the functions of a repeating fuse in that it disconnects the circuit only in response to overloads which are not cleared after a plurality of circuit opening and closing operations. Inasmuch as this device never is required to interrupt current, it may be applied to circuits having a wide range in fault current available at the point of application, thus simplifying circuit studies and installation problems to a great extent.

Having described preferred embodiments of the invention in accordance with the patent statutes, it is desired that the invention be not limited to these particular structures, inasmuch as it will be apparent, particularly to persons skilled in this art, that many changes and modifications may be made in these structures without departing from the broad spirit and scope of this invention. Accordingly, it is desired that the invention be interpreted as broadly as possible and that it be limited only as required by the prior art.

I claim as my invention:

1. A circuit opening device comprising, separable contacts, said contacts being biased apart, latch means normally maintaining said contacts in engagement, means responsive to a plurality of occurrences of a predetermined condition of the circuit for releasing said latch means, auxiliary latch means preventing separation of said contacts while said condition exists, and means responsive to the open condition of said circuit for releasing said auxiliary latch means to permit separation of said contacts.

2. A circuit opening device comprising, separable contacts, said contacts being biased apart, latch means normally maintaining said contacts in engagement, means responsive to a plurality of occurrences of a predetermined condition of the circuit for releasing said latch means, and auxiliary latch means preventing separation of said contacts while said condition exists and adapted to release said contacts in the absence of said condition.

3. A circuit opening device comprising, separable contacts, said contacts being biased apart, latch means normally maintaining said contacts in engagement, movable latch release means adapted when advanced a predetermined amount from a normal position to release said latch means, means responsive to the occurrence of a predetermined condition of the circuit for advancing said release means an amount less than said predetermined amount, whereby said latch means is released only after a plurality of occurrences of said predetermined condition, auxiliary latch means responsive to said condition to move to latching position to prevent separation of said contacts, and means for releasing said auxiliary latch means in the absence of said condition.

4. A circuit opening device comprising, separable contacts, said contacts being biased apart, latch means normally maintaining said contacts in engagement, movable latch release means adapted when advanced a predetermined amount from a normal position to release said latch means, means responsive to the occurrence of a predetermined condition of the circuit for advancing said release means an amount less than said predetermined amount, said release means being biased to return to its normal position, whereby said latch means is released only after a plurality of closely successive occurrences of said predetermined condition, auxiliary latch means for maintaining said contacts in engagement but normally biased to a released position, and means actuated by said latch release means when advanced said predetermined amount to move said auxiliary latch means to latching position.

5. A device of the type described comprising, a housing of insulating material having line contacts therein, said housing having an opening, a door mounted on said housing for movement to open and closed positions with respect to said opening and being biased to open position, contact means carried by said door for movement therewith into and out of bridging relation with said line contacts, releasable means for holding said door and contact means at closed position and means carried by said door which is responsive only to a plurality of occurrences of a predetermined condition of the circuit for releasing said releasable means to permit movement of said door and contact means to an open position relative to said housing and contacts, respectively.

6. A device of the type described comprising, a housing of insulating material having line contacts therein, said housing having an opening, a door mounted on said housing for movement to open and closed positions with respect to said opening and being biased to open position, contact means carried by said door for movement therewith into and out of bridging relation with said line contacts, releasable means for holding said door and contact means at closed position and means carried by said door which is responsive only to the cessation of current flow after a predetermined number of closely successive occurrences of a predetermined circuit condition for releasing said releasable means to permit movement of said door and contact means to an open position relative to said housing and contacts, respectively.

7. In a device of the type described, a housing of insulating material which is elongated in form having a rear wall with mounting means adapted to support said housing in a generally vertical position and having an open front, vertically spaced line contacts mounted in said housing, a door for the open front of said housing, an assembly carried by said door comprising spaced terminals and electro-responsive means connected between said terminals, means movably mounting said door and assembly adjacent the lower end thereof for movement of said door to open and closed positions and for movement of at least one of said terminals into and out of engagement with one of said line contacts, said door and assembly being biased to move to an open position, latch means for automatically holding said door and assembly closed in response to manual movement to closed position, and said assembly further including means responsive only to a predetermined number of closely successive operations of said electro-responsive means for causing release of said door and assembly and permitting movement thereof to an open position for inserting a visible gap in the circuit and clearly indicating operation of the device.

8. In a device of the type described, a housing of insulating material which is elongated in form having a rear wall with mounting means adapted to support said housing in a generally vertical position and having an open front, vertically spaced line contacts mounted in said housing, a door for the open front of said housing, an assembly carried by said door comprising spaced terminals and electro-responsive means connected between said terminals, means movably mounting said door and assembly adjacent the lower end thereof for movement of said door to open and closed positions and for movement of at least one of said terminals into and out of engagement with one of said line contacts, said door and assembly being biased to move to an open position, latch means for automatically holding said door and assembly closed in response to manual movement to closed position, said assembly further including means responsive only to a predetermined number of closely successive operations of said electro-responsive means for causing release of said door and assembly and permitting movement thereof to an open position for inserting a visible gap in the circuit and clearly indicating operation of the device, and said door having handle means at the exterior thereof which is manually operable to close said door and assembly and to release said latch means and move said door and assembly to an open position.

9. In a device of the type described, a housing of insulating material which is elongated in form having a rear wall with mounting means adapted to support said housing in a generally vertical position and having an open front, vertically spaced line contacts mounted in said housing, a door for the open front of said housing, an assembly carried by said door comprising spaced terminals and electro-responsive means connected between said terminals, means movably mounting said door and assembly adjacent the lower end thereof for movement of said door to open and closed positions and for movement of at least one of said terminals into and out of engagement with one of said line contacts, said door and assembly being biased to move to an open position, latch means for automatically holding said door and assembly closed in response to manual movement to closed position, said assembly further including means responsive only to a predetermined number of closely successive operations of said electro-responsive means for causing release of said door and assembly and permitting movement thereof to an open position for inserting a visible gap in the circuit and clearly indicating operation of the device, and said assembly further including means preventing release of said door and assembly but responsive to an opening of the circuit following the last one of said predetermined number of operations to release said door and assembly.

10. In a device of the type described, vertically spaced line contacts, an elongated contact bridging assembly mounted for movement adjacent its lower end for movement of a terminal portion adjacent the other end thereof into and out of engagement with the upper line contact, latch means automatically engageable with said assembly in response to circuit closing movement thereof to hold said assembly closed, said assembly having a longitudinally movable latch releasing member biased to a normal position at which it is spaced a predetermined distance from said latch means, said assembly further including in series with said terminal overload-responsive means adapted to advance said member an amount less than said predetermined distance upon each occurrence of an overload to release said latch means only in response to a predetermined number of occurrences of an overload on the circuit, auxiliary latch means for said assembly normally biased to a released position, and means responsive to energization of the circuit at least when said first mentioned latch means is released to cause said auxiliary latch means to hold said assembly at closed circuit position, so that said assembly can move to open the circuit only upon a deenergization of the circuit following a predetermined number of occurrences of overload on the circuit.

11. In a device of the type described, vertically spaced line contacts, an elongated contact bridging assembly mounted for movement adjacent its lower end for movement of a terminal portion adjacent the other end thereof into and out of engagement with the upper line contact, latch means automatically engageable with said assembly in response to circuit closing movement thereof to hold said assembly closed, said assembly comprising longitudinally extending tubular means, a slidably mounted latch releasing member in said tubular means biased to a normal position at which it is spaced a predetermined distance from said latch means, said assembly further including in series with said terminal a solenoid coil mounted on the outside of said tubular means and a core slidable in said tubular means, said core adapted to advance said latch releasing member an amount less than said predetermined distance upon each occurrence of an overload to release said latch means only in response to a predetermined number of occurrences of an overload on the circuit, and a portion of said tubular means comprising a dashpot cylinder cooperable with piston means movable with said latch releasing member for delaying return movement thereof.

12. In a device of the type described, vertically spaced line contacts, an elongated contact bridging assembly mounted for movement adjacent its lower end for movement of a terminal portion adjacent the other end thereof into and out of engagement with the upper line contact, latch means automatically engageable with said assembly in response to circuit closing movement thereof to hold said assembly closed, said assembly comprising longitudinally extending tubular means, latch release means guided for longitudinal movement by said tubular means, a solenoid coil having a core slidably mounted in said tubular means, at least a portion of said tubular means comprising a dashpot cylinder having piston means associated therewith for delaying movement of portions of said assembly, and said latch release means being conditioned by said core in response to a predetermined number of closely successive movements of said core to release said latch means in response to a closely succeeding open circuit condition.

13. In a device of the type described, vertically spaced line contacts, an elongated contact bridging assembly mounted for movement adjacent its lower end for movement of a terminal portion adjacent the other end thereof into and out of engagement with the upper line contact, latch means automatically engageable with said assembly in response to circuit closing movement thereof to hold said assembly closed, said assembly comprising longitudinally extending tubular means, latch release means guided for longitudinal movement by said tubular means, a solenoid coil having a core slidably mounted in said tubular means, and said latch means being conditioned by said core in response to a predetermined number of closely successive movements of said core to release said latch means in response to a closely succeeding open circuit condition.

ANDREW W. EDWARDS.

REFERENCES CITED

The following references are of record in the file of this patent:

UNITED STATES PATENTS

| Number | Name | Date |
| --- | --- | --- |
| 675,865 | Starr | June 4, 1901 |
| 1,737,649 | Edsall | Dec. 3, 1929 |
| 1,805,082 | Edsall | May 12, 1931 |
| 1,982,986 | Garlington | Dec. 4, 1934 |
| 2,253,400 | Shoemaker | Aug. 19, 1941 |
| 2,334,339 | Lemmon | Nov. 16, 1943 |
| 2,376,793 | Link | May 22, 1945 |
| 2,385,473 | Schultz | Sept. 25, 1945 |
| 2,387,372 | Watkins | Oct. 23, 1945 |
| 2,387,373 | Watkins | Oct. 23, 1945 |